United States Patent [19]

Motoyama et al.

[11] Patent Number: 5,425,135
[45] Date of Patent: Jun. 13, 1995

[54] PARALLEL INTERFACE FOR PRINTER

[75] Inventors: Tetsuro Motoyama, San Jose; Gregorio Rodriguez, Union City; Jeffrey R. Canion, San Jose, all of Calif.

[73] Assignees: Ricoh Company, Ltd., San Jose, Calif.; Ricoh Corporation, Tokyo, Japan

[21] Appl. No.: 225,074

[22] Filed: Apr. 8, 1994

Related U.S. Application Data

[63] Continuation of Ser. No. 69,689, May 28, 1993, which is a continuation of Ser. No. 906,027, Jun. 26, 1992, which is a continuation of Ser. No. 606,128, Oct. 31, 1990.

[51] Int. Cl.[6] .............................................. G06F 15/00
[52] U.S. Cl. ...................................... 395/114; 395/101
[58] Field of Search .................... 395/101, 112–114, 395/275, 325; 379/93, 100; 358/442, 462

[56] References Cited

U.S. PATENT DOCUMENTS 4,651,278  3/1987  Herzog et al. .
4,989,163  1/1991  Kawamata et al. ................. 364/519
4,992,956  2/1991  Kaku et al. ........................... 395/114
5,090,830  2/1992  Kroeger ............................... 395/325

OTHER PUBLICATIONS

IEEE P1284 D1.00, Mar. 15, 1993, Forrest D. Wright, et al., "Standard Signaling Method for a BI-Directional Parallel Peripheral Interface for Personal Computers", pp. 1–118.

"Parallel Port Controller (Type 1)", IBM Personal System/2 Hardware Interface, Technical Reference, May 1988, pp. i, ii, 1–8.

"Parallel Port Controller", IBM Personal System/2 Hardware Interface Technical Reference-Common Interfaces, Oct. 1990, pp. 7—12.

*Primary Examiner*—Arthur G. Evans
*Attorney, Agent, or Firm*—Oblon, Spivak, McClelland, Maier & Neustadt

[57] ABSTRACT

A parallel interface for external devices such as a printer with bi-directional transmission and direct memory access (DMA) capabilities. The present invention also provides a printer side interface to allow bi-directional capability which is compatible with current printer interfaces.

2 Claims, 4 Drawing Sheets

PARALLEL INTERFACE FOR PRINTER

This is a continuation of U.S. Patent Application Ser. No. 08/069,689 filed May 28, 1993, which is a continuation of U.S. Patent Application Ser. No. 07/906,027 filed Jun. 26, 1992, which is a continuation of U.S. Patent Application Ser. No. 07/606,128 filed on Oct. 31, 1990.

BACKGROUND OF THE INVENTION

The present invention relates to a parallel interface for an external device such as a scanner and printer, and more particularly to a parallel interface for a scanner and printer with bi-directional transmission and DMA (Direct Memory Access) capabilities.

A parallel interface has been the most popular interface between a personal computer and a printer. The interface uses Strobe, Busy, and Acknowledge signals to transfer the data reliably between the printer and the computer. Table 1A shows the typical pin assignment of the parallel interface for a printer, and FIG. 1 shows the timing requirements of the interface for a computer such as the typical PC, (e.g., an IBM PC). In FIG. 1, the parallel interface timing signals are the BUSY, ACKNLG, DATA and STROBE signals.

FIG. 2 shows a block diagram of the typical implementation of a parallel interface. In FIG. 2, system 10 is connected to address decoder control circuit 12 through system address bus 32 and system control bus 34. System 10 is also connected to transceiver 14 through system data bus 30.

Address decoder control circuit 12 communicates to transceiver 14 through internal control bus 22. Also, control circuit 12 communicates to output data latch 16 through control bus 22, as well as to read/write control logic 18.

Transceiver 14 communicates with output data latch 16 and read/write control logic 18 through internal data bus 24.

Output data latch 16 is connected to parallel port connector 20 through parallel data bus 26. Similarly, parallel port connector 20 is connected to read/write control logic 18 through parallel control bus 28.

In the case of a typical PC type computer, the handshake is built in the BIOS where the software controls the necessary checking of signals. However, this software approach does not allow fast data transfer from the host to a printer. The timing requirements of FIG. 1 suggest a maximum transfer rate of 156K bytes per second while the manual suggests 1K bytes per second transfer rate.

When a large amount of data (such as data representative of an image) is involved, the communication between the host computer and the printer becomes a bottleneck. In addition, a host computer can not receive the limited status information of a printer through few control signals because the data are transferred only from the host computer to the printer.

When image scanners were introduced, interfaces to a host computer were typically a parallel interface and RS232 interface. The parallel interface is similar to the one used for a printer, except that the direction of data movement is bi-directional.

Tables 1A and 1B summarize the printer and scanner pin assignments, respectively. In Table 1B for a scanner, pin 15 is typically assigned to control the direction of the data. When the signal is high, the data transfer from a host to a device. When it is low, the direction is reversed.

Table 2 shows the PC printer interface cable definition. Table 2 shows that the pin 15 of the host side is a major source of conflict between a scanner and a printer. The rest of the pins are covered by scanner or printer pin definitions.

The problem of data transfer rate from a host computer to a printer or plotter was addressed by IKON. IKON developed two boards which can use the DMA capability of the typical PC type computer. However, the major targets of their boards were plotters and printers. Therefore, their connector was not the standard 25 pin connector. This does not allow regular printer cable to be used. In addition, the boards have extra capability which are not required for a regular printer use. Examination of the boards showed more than 60 chips resulting in higher cost.

Ricoh Corporation has developed a parallel interface card, ISI-8, for a scanner family. This board was specially designed for scanner use and the design did not address the possible use for a printer. Because a scanner uses pin 15 for a direction control (Table 1B), this line is critical to the scanner use. The signal is controlled by a host computer side as an output signal to a device. However, in a regular printer cable, pin 15 is connected with pin 32 of a printer as an input from a device to a host computer. Therefore, the current ISI-8 interface card cannot be connected with a printer through the regular cable.

SUMMARY OF THE INVENTION

It is an object of the present invention to provide a parallel interface for external devices such as a printer and a scanner, to support the regular printer cable when used with a printer, and to use the DMA capabilities of a host computer.

It is another object of the present invention to provide a printer side interface to allow bi-directional capability which is compatible with the current printer interface.

Additional objects, advantages and novel features of the present invention will be set forth in part in the description which follows and in part become apparent to those skilled in the art upon examination of the following or may be learned by practice of the invention. The objects and advantages of the present invention may be realized and attained by means of the instrumentalities and combinations which are pointed out in the appended claims.

BRIEF DESCRIPTION OF THE DRAWINGS

The accompanying drawings which are incorporated in and form a part of this specification illustrate an embodiment of the present invention and, together with the following detailed description, serve to explain the principles of the invention.

DETAILED DESCRIPTION OF THE DRAWINGS

Figure 2:
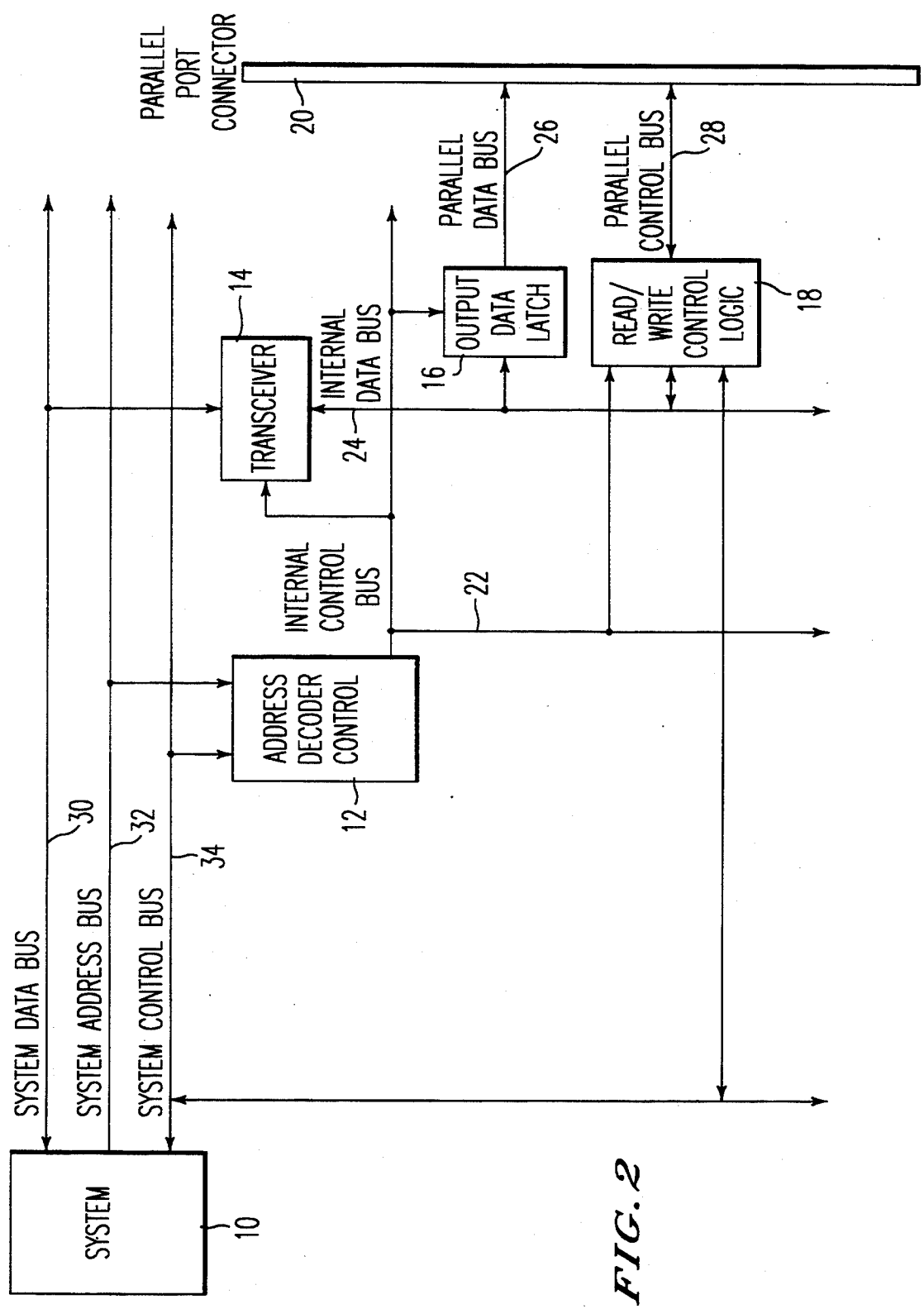
FIG. 2 depicts a typical parallel interface port.
Figure 3:
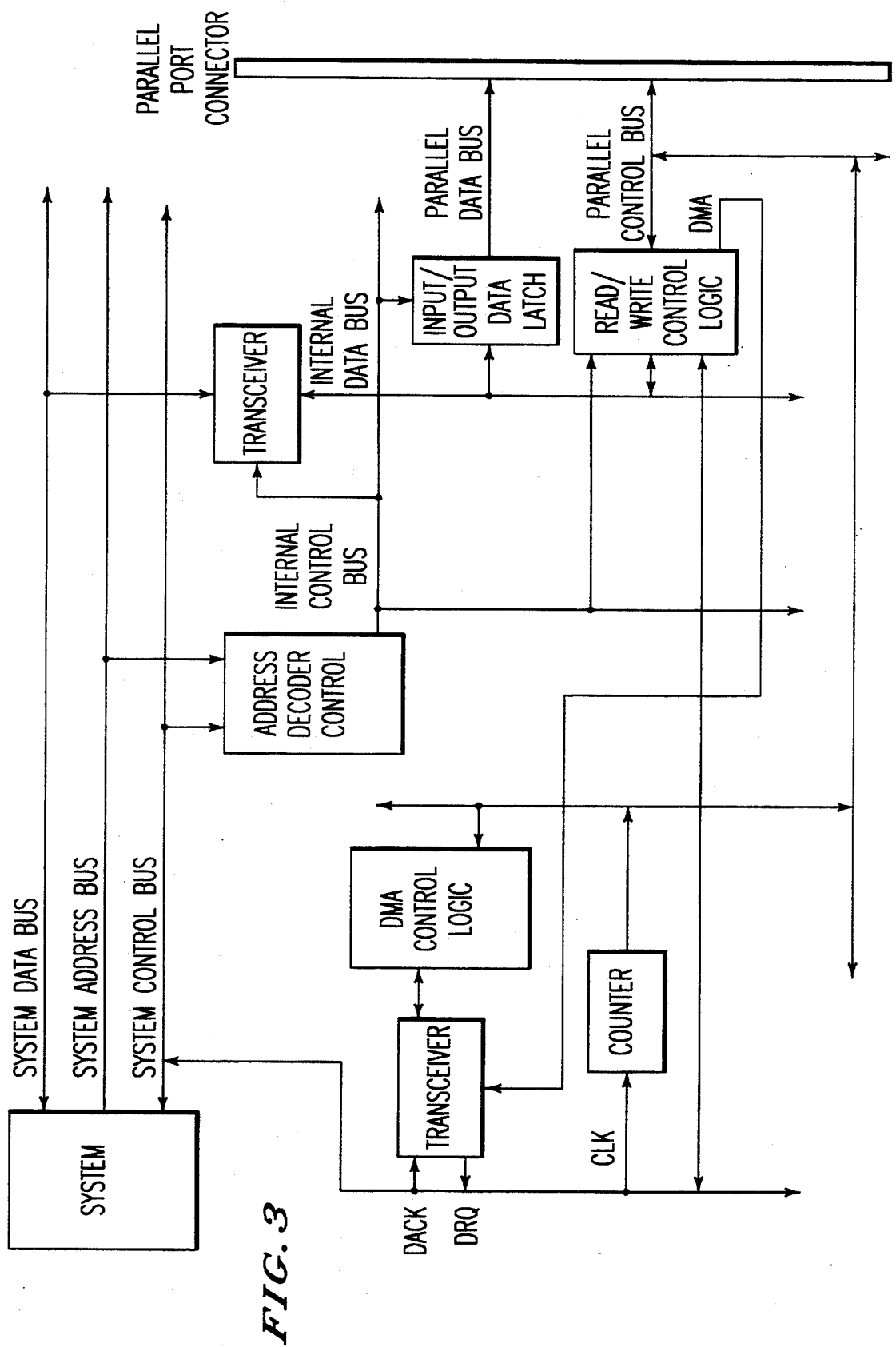
FIG. 3 depicts a parallel interface port with direct memory access (DMA) capability according to the present invention.

FIG. 3 shows a block diagram of a parallel interface which uses DMA to transfer data. It is assumed that the host computer has a DMA controller circuit which can be used for data transfer. The system 50, address decoder control 52, transceiver 54, input/output data logic 56, read/write control logic 58 and parallel port connector 61 are analogous to that of FIG. 2. Also, the data, address and control bus connections 60, 62, 64 are analogous to that of FIG. 2 as well.

In FIG. 3, transceiver 84 is connected to DMA control logic 80 via bus 86. The parallel DMA block diagram of FIG. 3 also includes Counter 82, which communicates with DMA control logic 80 through common bus 70.

Read/write control logic 58 communicates with transceiver 84 through DMA bus 90.

Transceiver 84, DMA Control Logic 80 and Counter 82 are included to handle DMA, in particular, the DACK and DRQ signals on bus 88.

Figure 1:
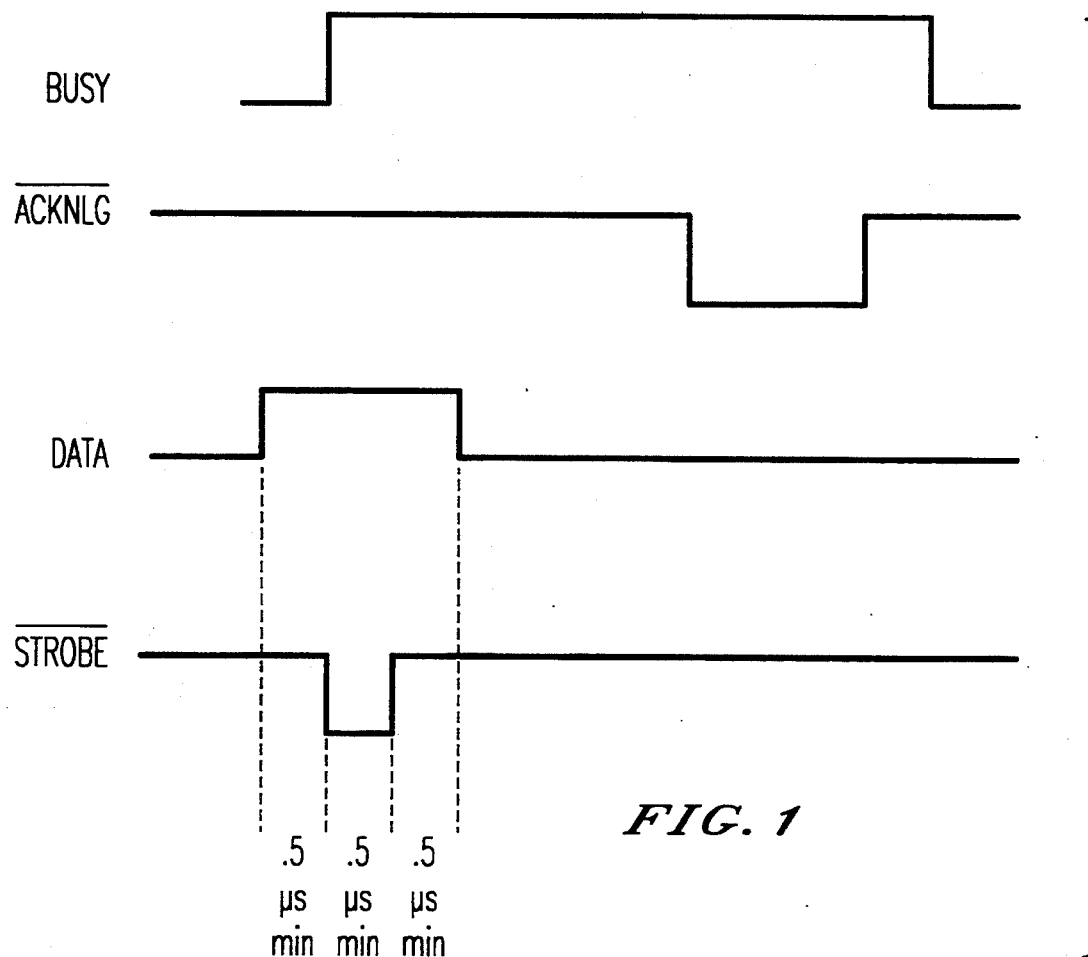
FIG. 1 depicts a parallel interface timing diagram known in the prior art.

DMA Control Logic 80 works with read/write Control Logic 58 so that DMA's control signals can work with the control signals of a Printer Parallel Interface such as shown in FIG. 1. If the DMA controller circuit is not available in the host computer, a DMA control circuit should be added into FIG. 3. Most implementations can use the design of an ISI-8 card except those related with pin 15, as described above.

Figure 4:
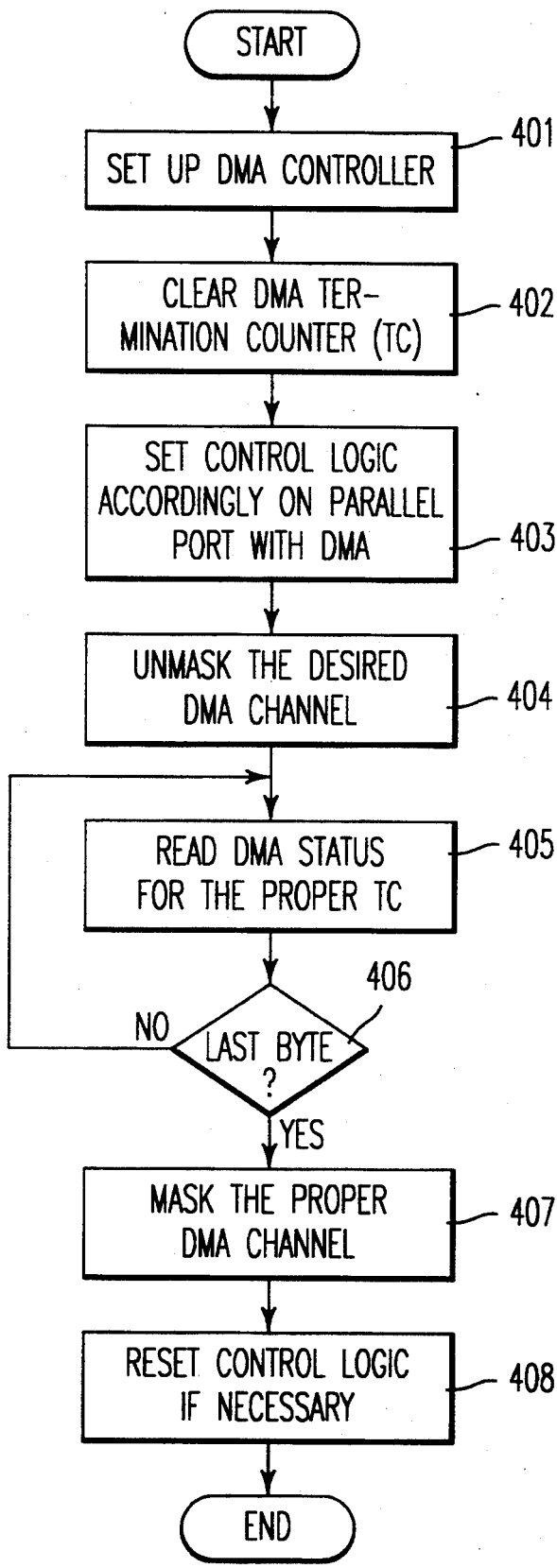
FIG. 4 depicts a flow chart for DMA set up and control of FIG. 3.

FIG. 4 shows a flow chart of how to set up DMA and how to transfer the data in conjunction with FIG. 3. Step 401 sets up the DMA controller such as setting up base address, word count, and mode register (channel selection and read memory operation). In the case of a typical PC, a page register has to set up in addition to DMA. Step 402 clears the DMA termination counter (TC). Step 403 sets up the DMA control logic which satisfies the parallel interface requirements to use DMA. This may involve the selection of DMA channel and other features required by a particular implementation and/or system.

Step 404 starts DMA, unmasking the desired DMA channel. Step 405 reads the DMA status for the proper TC step. Step 406 tests if all the data are transferred. Another implementation is to use interrupt when TC is reached rather than pooling the TC. Step 407 disables DMA, and Step 408 resets the DMA control logic (if necessary).

FIG. 4 does not show error recovery. In realistic conditions, time-out due to the printer failure or other causes should be added to recover from the system hangup.

The DMA transfer resulted in the transfer rate of approximately 85K bytes/sec while the simplest assembly code using the prior art approaches resulted in the transfer rate of 43K bytes/sec. Under realistic conditions, however, the software approach is likely to be slower because of the complexity such as subroutine calls or BIOS calls.

Figure 5:
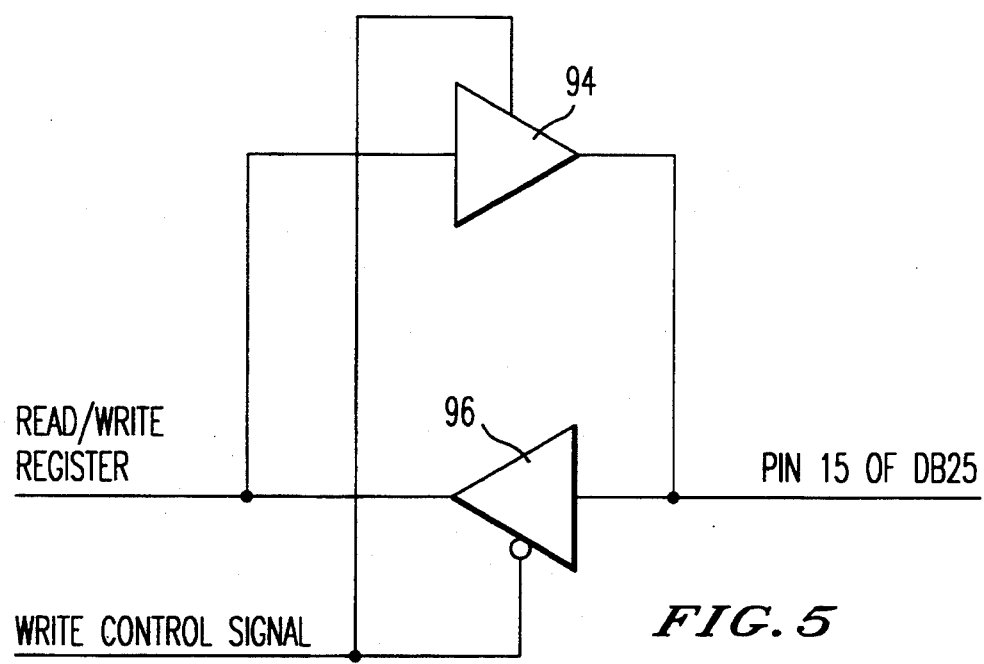
FIG. 5 depicts a schematic diagram of a control circuit for the present invention.

FIG. 5 shows a circuit for pin 15 which is bi-directional rather than input only or output only. A signal from the Read/Write register is input through gate 94 to pin 15. A signal from pin 15 is input through gate 96 to the Read/Write register. Gates 94, 96 are controlled by a suitable Write Control signal.

Figure 6:
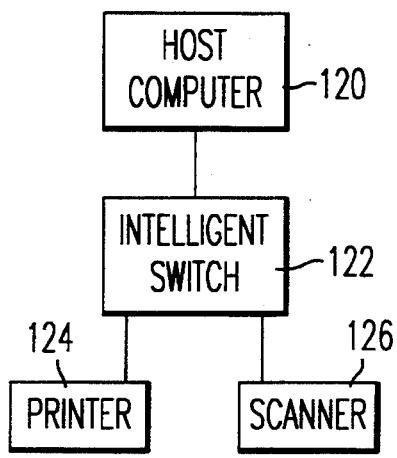
FIG. 6 depicts a block diagram of a host computer connected to an external device such as a printer or scanner.

FIG. 6 shows one implementation of a parallel interface for an external device such as a scanner or printer. In FIG. 6 a host computer 120 is connected to an external device such as printer 124 or scanner 126 through intelligence switch 122.

In actual implementation, the physical switch to generate a write control signal is advisable. Even with this modification, however, the cables for a printer and for a scanner are different because pin 15 of the host side is connected to pin 32 of a printer and to pin 15 of a scanner.

In order to allow the bi-directional communication of a printer, the pin 15 of the 36 device pins should be changed from NC to PR/-SC signal line. In addition, one of the GND lines should be used to connect pin 15 of the device to the host interface. This change allows the current system to work with no modification and allows the same cable to be used for a printer and a scanner. Pin assignment of PR/-SC signal for the interface board, currently 15, must change the newly assigned pin.

Table 3 shows an improved pin assignment. Acknowledge is changed to keep symmetric handshake. Pin 15 is renamed from PR/-SC to Host/-Device because the improved pin assignment is not limited to a printer and a scanner. Any device which requires a simple parallel interface can use the same handshake. Pin 32 is renamed from Error to Attention. The connected device can use this line to call attention of a host computer. Then, any operation or mode can be either suspended or terminated by the host computer and the computer can inquire the nature of the necessary service of the device. The capability of bi-directional data communication with a printer enhances the operation environment.

Under the current parallel interface specification, a host computer can get some limited information of the status of a printer. With bi-directional data communication, a printer can send diagnostics and error status report to a host computer. This capability is particularly important to a complicated language, such as page description language. Under the interactive mode or two-way communication mode, not only the hardware errors but also software errors can be reported by a printer. When the timing requirement of FIG. 1 is shortened, the maximum data transfer rate will be increased.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the invention be defined only by the claims appended hereto.

TABLE 1A

| Pin Definition of a printer and a Ricoh Scanner | | | |
|---|---|---|---|
| Printer Pin | | | |
| -Strobe (in) | 1 | 19 | Strobe Return (GND) |
| Data 1 (in) | 2 | 20 | Data 1 (GND) |

TABLE 1A-continued
Pin Definition of a printer and a Ricoh Scanner

| Printer Pin | | | |
|---|---|---|---|
| Data 2 (in) | 3 | 21 | Data 2 (GND) |
| Data 3 (in) | 4 | 22 | Data 3 (GND) |
| Data 4 (in) | 5 | 23 | Data 4 (GND) |
| Data 5 (in) | 6 | 24 | Data 5 (GND) |
| Data 6 (in) | 7 | 25 | Data 6 (GND) |
| Data 7 (in) | 8 | 26 | Data 7 (GND) |
| Data 8 (in) | 9 | 27 | Data 8 (GND) |
| -Acknowledge (out) | 10 | 28 | Acknowledge Return (GND) |
| Busy (out) | 11 | 29 | Busy Return (GND) |
| Paper error (out) | 12 | 30 | Signal GND |
| Select (out) (HP LJ) (EPSON pulled up) | 13 | 31 | Init (in) |
| -Autofeed (in) (EPSON) (HP LJ NC) | 14 | 32 | Error (out) |
| NC | 15 | 33 | Auxout 1 (out) (HP LJ) (EPSON FX GND) |
| 0 VDC | 16 | 34 | NC |
| Chassis GND | 17 | 35 | Auxout 2 (out) |
| +5 VDC (out) (HP LJ) (EPSON FX NC) | 18 | 36 | Select in (in) (EPSON FX) (HP LJ NC) |

TABLE 1B
Ricoh IS30 scanner pin

| | | | |
|---|---|---|---|
| -Strobe (in/out) | 1 | 19 | GND |
| Data 1 (in/out) | 2 | 20 | GND |
| Data 2 (in/out) | 3 | 21 | GND |
| Data 3 (in/out) | 4 | 22 | GND |
| Data 4 (in/out) | 5 | 23 | GND |
| Data 5 (in/out) | 6 | 24 | GND |
| Data 6 (in/out) | 7 | 25 | GND |
| Data 7 (in/out) | 8 | 26 | GND |
| Data 8 (in/out) | 9 | 27 | GND |
| -Acknowledge (output) | 10 | 28 | GND |
| Busy (in/out) | 11 | 29 | GND |
| Paper error (out) | 12 | 30 | GND |
| VCC | 13 | 31 | Init (in) |
| NC | 14 | 32 | NC |
| PR/-SC (in) | 15 | 33 | NC |
| NC | 16 | 34 | NC |
| Frame GND | 17 | 35 | NC |
| NC | 18 | 36 | NC |

TABLE 2
Printer Cable Specification

| | Host Side | | Printer Side | |
|---|---|---|---|---|
| | 25 Pins | | 36 Pins | Scanner |
| -Strobe | 1 | → | 1 | ⇌ |
| D1 | 2 | → | 2 | ⇌ |
| D2 | 3 | → | 3 | ⇌ |
| D3 | 4 | → | 4 | ⇌ |
| D4 | 5 | → | 5 | ⇌ |
| D5 | 6 | → | 6 | ⇌ |
| D6 | 7 | → | 7 | ⇌ |
| D7 | 8 | → | 8 | ⇌ |
| D8 | 9 | → | 9 | ⇌ |
| -Ack | 10 | ← | 10 | ← |
| Busy | 11 | ← | 11 | ⇌ |
| Paper Error | 12 | ← | 12 | ← |
| Select | 13 | ← | 13 | VCC (+5 V) with 220 Ohm |
| -Auto Feed | 14 | → | 14 | NC |
| -Error | 15 | ← | 32 | Pin 32 NC/Pin 15 PR/-SC → |
| -Init | 16 | → | 31 | → |
| -Select | 17 | → | 36 | NC |
| GND | 18 | — | 33 | NC |
| GND | 19 | — | 19 | GND |
| GND | 20 | — | 21 | GND |
| GND | 21 | — | 23 | GND |
| GND | 22 | — | 25 | GND |
| GND | 23 | — | 27 | GND |
| GND | 24 | — | 29 | GND |

TABLE 2-continued
Printer Cable Specification

| | Host Side | | Printer Side | |
|---|---|---|---|---|
| | 25 Pins | | 36 Pins | Scanner |
| GND | 25 | — | 30 | GND |

TABLE 3
Improved Pin Assignment

| | | | |
|---|---|---|---|
| -Strobe (in/out) | 1 | 19 | Strobe Return (GND) |
| Data 1 (in/out) | 2 | 20 | Data 1 (GND) |
| Data 2 (in/out) | 3 | 21 | Data 2 (GND) |
| Data 3 (in/out) | 4 | 22 | Data 3 (GND) |
| Data 4 (in/out) | 5 | 23 | Data 4 (GND) |
| Data 5 (in/out) | 6 | 24 | Data 5 (GND) |
| Data 6 (in/out) | 7 | 25 | Data 6 (GND) |
| Data 7 (in/out) | 8 | 26 | Data 7 (GND) |
| Data 8 (in/out) | 9 | 27 | Data 8 (GND) |
| -Acknowledge (in/out) | 10 | 28 | Acknowledge Return (GND) |
| Busy (in/out) | 11 | 29 | Busy Return (GND) |
| Paper error (out) | 12 | 30 | Signal GND |
| Select (out) | 13 | 31 | -Init (in) |
| -Autofeed (in) | 14 | 32 | -Attention (out) |
| Host/-Device (in) | 15 | 33 | Auxout 1 (out) |
| 0 VDC | 16 | 34 | NC |
| Chassis GND | 17 | 35 | Auxout 2 (out) |
| +5 VDC (out) | 18 | 36 | -Select in (in) |

What is claimed is:

1. A method of signalling between a host computer and a printer and scanner connected to the host computer, comprising the steps of:
transmitting first parallel data from the host computer to the printer;
wherein said first parallel data is transmitted using an 8 bit parallel format;
wherein said first parallel data is transmitted using 8 lines of a plurality of lines of a Centronics type cable connecting the host computer to the printer;
transmitting a first signal on one of said plurality of lines of said Centronics type cable which is other than said 8 lines of said Centronics type cable, when said first data is being transmitted from said host to said printer;
transmitting a second signal from said printer to said host on one of said plurality of lines of said Centronics type cable which is other than said 8 lines of said Centronics type cable;
transmitting second parallel data from the printer to the host computer in response to the transmission of the first parallel data to the printer, after said second signal is transmitted;
wherein said second parallel data is transmitted using an 8 bit parallel format;
wherein said second parallel data is transmitted using said 8 lines of said Centronics type cable connecting the host computer to the printer;
wherein said step of transmitting instructions from the host computer to the printer and said step of transmitting said at least one of diagnostic and error information from the printer to the host computer transmit said instructions and said at least one of diagnostic and error information bi-directionally over said 8 lines of said Centronics type cable;
wherein said second parallel data is at least one of error and diagnostic information from the printer;
wherein said step of transmitting instructions from the host computer to the printer and said step of transmitting said at least one of diagnostic and error information from the printer to the host computer transmit said instructions and said at least one of diagnostic and error information bi-directionally over said 8 lines of said Centronics type cable;

switching a connection between the host computer and the printer to a connection between the host computer and the scanner using a switch connecting the host computer to one of the printer and the scanner;

transmitting third parallel data from the host computer to the scanner;

wherein said third parallel data is transmitted using said 8 bit parallel format;

wherein said third parallel data is transmitted using said 8 lines of said Centronics type cable connecting the host computer to the scanner;

transmitting a third signal on one of said plurality of lines of said Centronics type cable which is other than said 8 lines of said Centronics type cable, when said third data is being transmitted from said host to said scanner;

transmitting a fourth signal from said scanner to said host on one of said plurality of lines of said Centronics type cable which is other than said 8 lines of said Centronics type cable;

transmitting fourth parallel data from the scanner to the host computer in response to the transmission of the third parallel data to the scanner, after said fourth signal is transmitted;

wherein said second parallel data is transmitted using said 8 bit parallel format;

wherein said second parallel data is transmitted using said 8 lines of said Centronics type cable connecting the host computer to the scanner.

2. A method of signalling between a host computer and a printer and scanner connected to the host computer, comprising the steps of:

transmitting first parallel data from the host computer to the printer using an 8 bit parallel format;

wherein said first parallel data is transmitted using 8 lines of a plurality of lines of a cable connecting the host computer to the printer which has a connector on each end thereof and the 8 lines of the plurality of lines are connected to pins 2-9 on the connector which connects to the host computer for transmission of data;

transmitting a first signal on one of said plurality of lines of said cable which is other than said 8 lines of said cable, when said first data is being transmitted from said host to said printer;

transmitting a second signal from said printer to said host on one of said plurality of lines of said cable which is other than said 8 lines of said cable;

transmitting second parallel data from the printer to the host computer in response to the transmission of the first parallel data to the printer, after said second signal is transmitted;

wherein said second parallel data is transmitted using an 8 bit parallel format;

wherein said second parallel data is transmitted using said 8 lines of said cable connecting the host computer to the printer;

wherein said step of transmitting instructions from the host computer to the printer and said step of transmitting said at least one of diagnostic and error information from the printer to the host computer transmit said instructions and said at least one of diagnostic and error information bi-directionally over said 8 lines of said cable;

wherein said second parallel data is at least one of error and diagnostic information from the printer;

wherein said step of transmitting instructions from the host computer to the printer and said step of transmitting said at least one of diagnostic and error information from the printer to the host computer transmit said instructions and said at least one of diagnostic and error information bi-directionally over said 8 lines of said cable;

switching a connection between the host computer and the printer to a connection between the host computer and the scanner using a switch connecting the host computer to one of the printer and the scanner;

transmitting third parallel data from the host computer to the scanner;

wherein said third parallel data is transmitted using said 8 bit parallel format;

wherein said third parallel data is transmitted using said 8 lines of said cable connecting the host computer to the scanner;

transmitting a third signal on one of said plurality of lines of said cable which is other than said 8 lines of said cable, when said third data is being transmitted from said host to said scanner;

transmitting a fourth signal from said scanner to said host on one of said plurality of lines of said cable which is other than said 8 lines of said cable;

transmitting fourth parallel data from the scanner to the host computer in response to the transmission of the third parallel data to the scanner, after said fourth signal is transmitted;

wherein said second parallel data is transmitted using said 8 bit parallel format;

wherein said second parallel data is transmitted using said 8 lines of said cable connecting the host computer to the scanner.

* * * * *